(12) United States Patent
Tse et al.

(10) Patent No.: US 12,173,612 B2
(45) Date of Patent: Dec. 24, 2024

(54) POWER TURBINE SHAFT WITH HUB ASSEMBLY FOR GAS TURBINE ENGINE

(71) Applicant: Solar Turbines Incorporated, San Diego, CA (US)

(72) Inventors: Kwok-Kwong B. Tse, San Diego, CA (US); George L. Prater, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/112,972

(22) Filed: Feb. 22, 2023

(65) Prior Publication Data

US 2024/0280022 A1    Aug. 22, 2024

(51) Int. Cl.
 F01D 5/02 (2006.01)
 F01D 17/06 (2006.01)
 F16D 1/08 (2006.01)

(52) U.S. Cl.
 CPC ............ F01D 5/025 (2013.01); F01D 5/027 (2013.01); F01D 17/06 (2013.01); F16D 1/08 (2013.01); *F05D 2220/32* (2013.01); *F05D 2240/24* (2013.01)

(58) Field of Classification Search
 CPC . F01D 5/025; F01D 5/027; F01D 5/06; F16D 1/08; F16D 1/0876; F04D 29/662
 See application file for complete search history.

(56) References Cited

U.S. PATENT DOCUMENTS

| | | | |
|---|---|---|---|
| 3,964,342 A | 6/1976 | Beam, Jr. et al. | |
| 3,985,465 A | 10/1976 | Sheldon et al. | |
| 5,545,010 A * | 8/1996 | Cederwall | F01D 5/027 415/201 |
| 5,860,865 A | 1/1999 | Smith | |
| 6,213,720 B1 * | 4/2001 | Farmer | F01D 5/021 416/198 A |
| 6,447,250 B1 * | 9/2002 | Corrigan | F01D 11/008 416/193 A |
| 8,215,910 B2 * | 7/2012 | Belmonte | F01D 5/027 416/144 |
| 9,260,971 B2 | 2/2016 | Yoshida et al. | |
| 10,364,688 B2 | 7/2019 | Hummel et al. | |
| 10,711,629 B2 | 7/2020 | van der Merwe et al. | |

(Continued)

FOREIGN PATENT DOCUMENTS

| | | | |
|---|---|---|---|
| DE | 2507695 | 8/1975 | |
| DE | 3532929 | 3/1987 | |
| DE | 102008055676 A1 * | 5/2010 | ............ F01D 5/025 |

OTHER PUBLICATIONS

Written Opinion and International Search Report for Int'l. Patent Appln. No. PCT/US2024/013909, mailed Jul. 11, 2024 (13 pgs).

*Primary Examiner* — Topaz L. Elliott

(57) ABSTRACT

Conventionally, trim balancing for a power turbine has been performed at the equipment coupling. Disclosed embodiments comprise a hub that is installed on the shaft. This hub enables trim balancing to be performed on the shaft coupling, closer to the rotor, which is more effective. The disclosed hub also enables unbalance corrections to remain with the power turbine after uncoupling. In addition, the use of the hub improves efficiency and eliminates safety risks faced by personnel in the field during coupling of the power turbine to the equipment.

19 Claims, 5 Drawing Sheets

(56) References Cited

U.S. PATENT DOCUMENTS

| | | | |
|---|---|---|---|
| 2004/0156708 A1* | 8/2004 | Allam | F16F 15/34 |
| | | | 415/144 |
| 2009/0087313 A1* | 4/2009 | Belmonte | F01D 5/027 |
| | | | 416/144 |
| 2013/0323077 A1* | 12/2013 | Giannakopoulos | F01D 5/025 |
| | | | 416/93 R |
| 2016/0326876 A1* | 11/2016 | Lopez | F04D 29/662 |
| 2018/0281163 A1* | 10/2018 | Bayer | B25B 27/18 |
| 2020/0040764 A1* | 2/2020 | Hugon | F01D 5/025 |
| 2020/0173308 A1* | 6/2020 | Oki | F02B 39/16 |
| 2021/0071646 A1 | 3/2021 | Schroer | |
| 2022/0145768 A1* | 5/2022 | Angel | F01D 5/10 |

* cited by examiner

POWER TURBINE SHAFT WITH HUB ASSEMBLY FOR GAS TURBINE ENGINE

TECHNICAL FIELD

The embodiments described herein are generally directed to gas turbine engines, and, more particularly, to a hub for the shaft of the turbine in a gas turbine engine.

BACKGROUND

The rotor in a turbine of a gas turbine engine may experience high vibration in test cells or in the field, due to the residual unbalance of the rotor and/or the coupling of equipment to the shaft. If the hub of the equipment is not installed squarely or concentrically with the shaft, the hub may cause additional unbalance and/or misalignment as the equipment is driven by the shaft. Such unbalance and misalignment can detrimentally affect the reliability and service life of the components of the gas turbine engine, such as blades, bearings, seals, and/or the like.

Conventionally, the rotor of the turbine cannot be trim-balanced directly. Thus, for trim balancing, trim weight is adding to the equipment's coupling flange that is closest to the rotor. However, depending on the mode shape of the system, the coupling flange may not be the most efficient location for unbalance correction. In addition, if the coupling is replaced, the trim weights will travel with the coupling flange, as opposed to the turbine, such that trim balancing will have to be repeated with the new coupling. Furthermore, when the equipment needs to be coupled in the field, the hub of the equipment must be heated up evenly and then shrunk onto the shaft. The process of preparing the heat source and handling the heavy, heated hub represents a significant safety risk to field personnel.

The present disclosure is directed toward overcoming one or more of the problems discovered by the inventors.

SUMMARY

In an embodiment, a hub for a turbine shaft comprises: a cylindrical main body that is open at a forward end and at least partially closed at an aft end along a longitudinal axis, wherein the aft end comprises a plurality of first axial apertures; a middle portion extending outward from the main body, wherein the middle portion includes a plurality of trim-weight holes arranged circumferentially around the longitudinal axis, wherein each of the plurality of trim-weight holes is configured to hold a trim weight; and a flange extending outward from the middle portion, wherein the flange includes a plurality of second axial apertures.

In an embodiment, a hub for a turbine shaft comprises: a cylindrical main body that is open at a forward end and at least partially closed at an aft end along a longitudinal axis, wherein the aft end comprises a plurality of first axial apertures, and wherein the main body comprises a plurality of engagement members arranged along a circumference of an inner surface of the main body, a plurality of first notches arranged at equidistant intervals around a circumference of an outer surface of the main body, and a second notch in an outer surface of the main body at an axial position that is different from an axial position of the plurality of first notches along the longitudinal axis; a middle portion extending outward from an aft portion of the main body, wherein the middle portion includes a plurality of trim-weight holes arranged circumferentially around the longitudinal axis, wherein each of the plurality of trim-weight holes is configured to hold a trim weight; and a flange extending outward from the middle portion, wherein the flange includes a plurality of second axial apertures.

In an embodiment, an assembly comprises: a turbine shaft that includes a plurality of first engagement members arranged along a circumference of an outer surface of the turbine shaft, and a plurality of axial holes in an aft end of the turbine shaft; a hub that includes a cylindrical main body encircling an aft portion of the turbine shaft, wherein the main body is at least partially closed at an aft end, wherein the aft end comprises a plurality of first axial apertures that are aligned with the plurality of axial holes in the aft end of the turbine shaft, and wherein the main body comprises a plurality of second engagement members, arranged along a circumference of an inner surface of the main body, that engages with the plurality of first engagement members, a middle portion extending outward from the main body, wherein the middle portion includes a plurality of trim-weight holes arranged circumferentially around a longitudinal axis of the turbine shaft, and wherein each of the plurality of trim-weight holes is configured to hold a trim weight, and a flange extending outward from the middle portion, wherein the flange includes a plurality of second axial apertures; and a plurality of fasteners, wherein each of the plurality of fasteners extends through an aligned pair of one of the first axial apertures and one of the plurality of axial holes, to thereby fix the hub to the turbine shaft.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
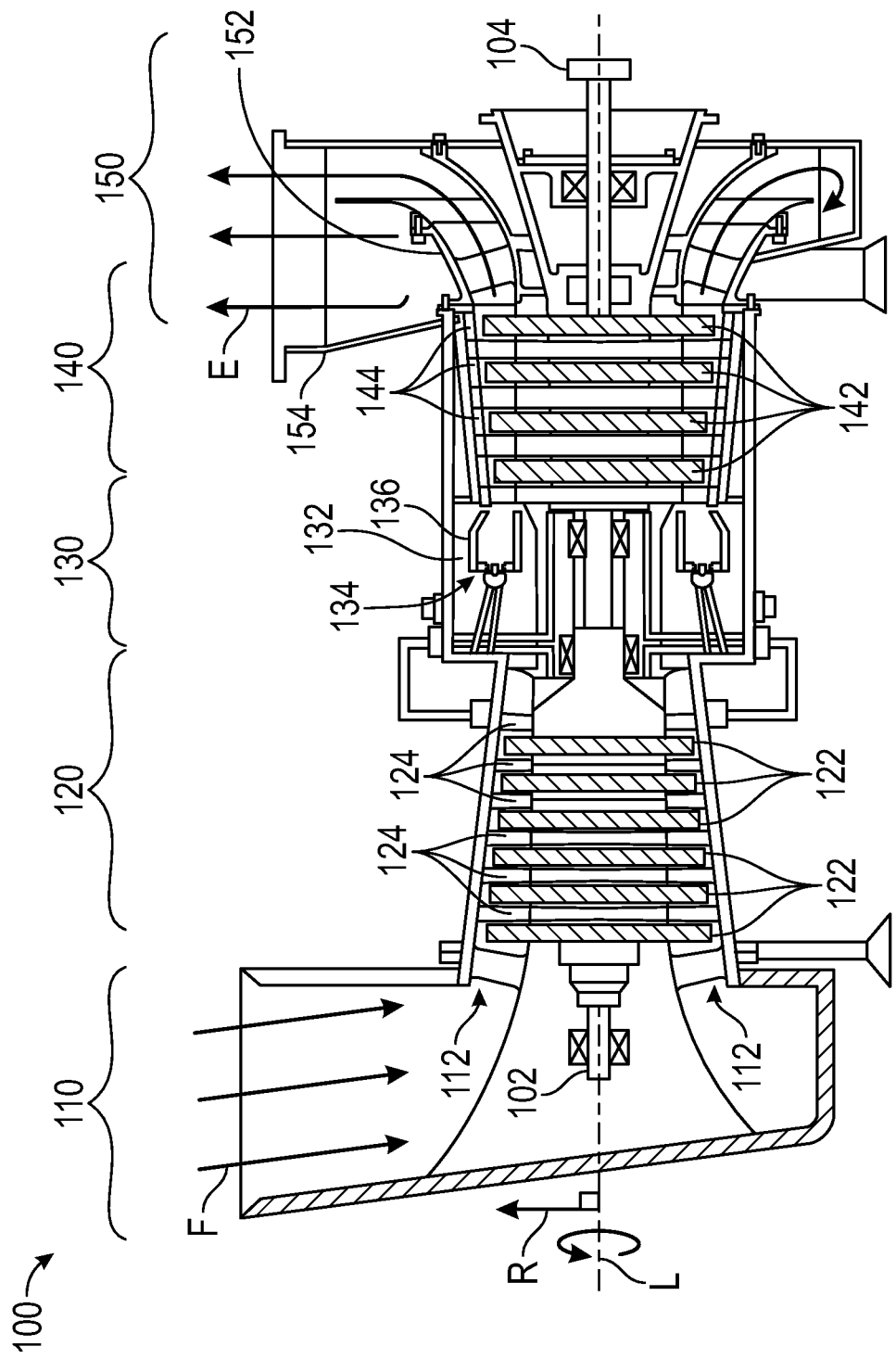
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). In addition, as used herein, the terms "respective" and "respectively" signify an association between members of a group of first components and members of a group of second components. For example, the phrase "each component A connected to a respective component B" would signify A1 connected to B1, A2 connected to B2, . . . and AN connected to BN.

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to a longitudinal axis L. A radial axis may refer to any axis or direction that radiates outward from longitudinal axis L at a substantially orthogonal angle to longitudinal axis L, such as radial axis R in FIG. 1. Thus, the term "radially outward" or "radially outer" should be understood to mean farther from or away from longitudinal axis L, whereas the term "radially inward" or "radially inner" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104, to which equipment (e.g., generator set, gas compressor, etc.) that is driven by gas turbine engine 100 can be coupled. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, HASTELLOY®, INCONEL®, Waspaloy, Rene alloys, HAYNES® alloys, INCOLOY®, MP98T, TMS alloys, and CMSX® single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along an axial axis that is parallel to longitudinal axis L, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142, which may be collectively referred to herein as the "rotor," and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
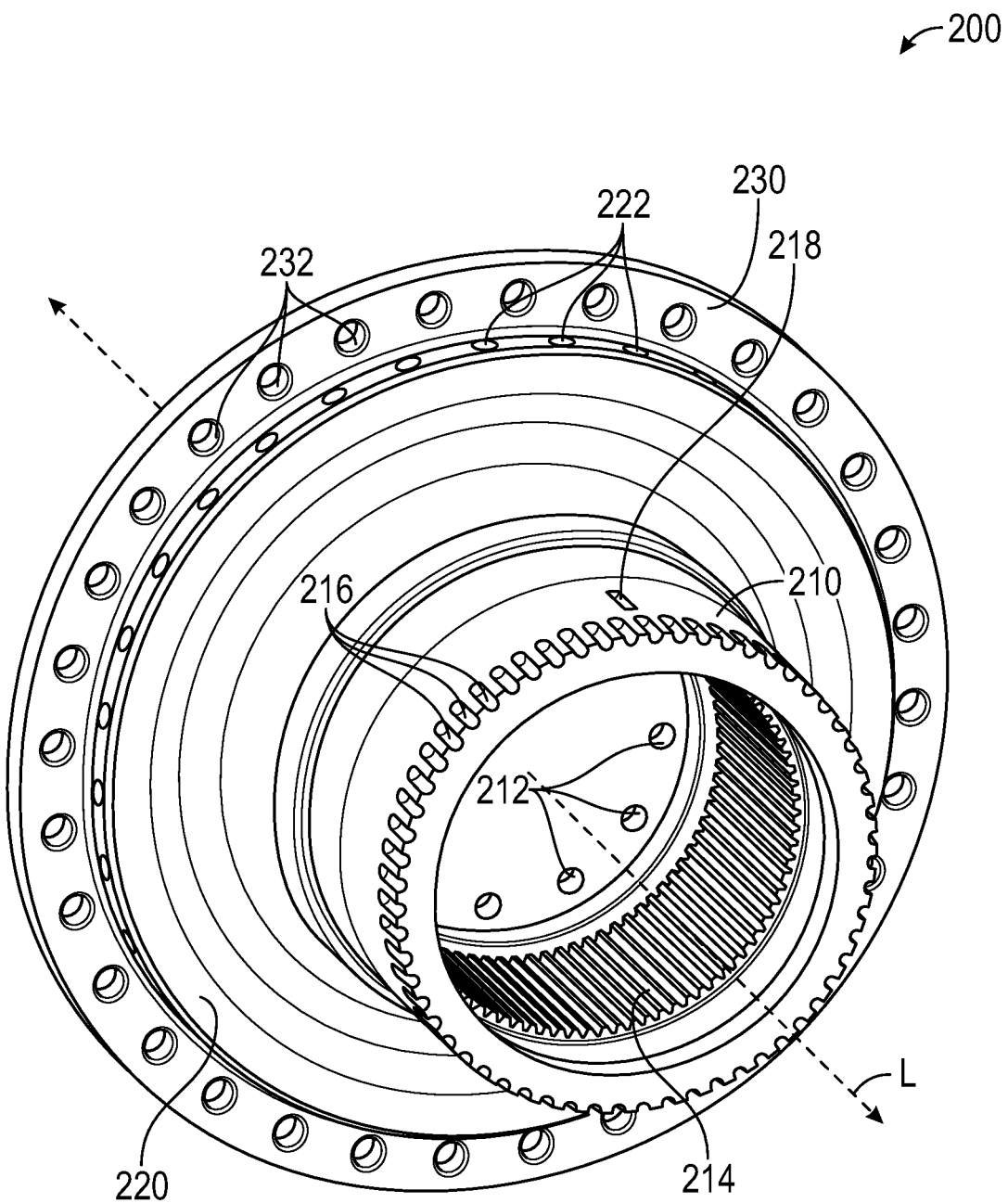
FIG. 2 illustrates a forward perspective view of a hub, according to an embodiment.

FIG. 2 illustrates a forward perspective view of a hub 200, according to an embodiment. Hub comprises a main body 210, a middle portion 220 extending radially from main body 210, and a flange 230 extending from the aft end of middle portion 220. Middle portion 220 may extend radially and/or axially outward from a portion (e.g., aft portion) of main body 210 in a flared and/or stepped design. Flange 230 may extend radially and/or axially outward from the aft end of middle portion 220. Main body 210, middle portion 220, and flange 230 may be manufactured as a single integrated piece of the same material, or may be manufactured as two or more different pieces of the same or different materials that are joined together (e.g., by welding).

Main body 210 may be cylindrical around longitudinal axis L, and be open at the forward end and closed at the aft end along longitudinal axis L. Alternatively, main body 210 could be partially closed at the aft end, for example, with a circular opening, such that a portion of shaft 102 is exposed therethrough. The open end of main body 210 is configured to receive and encircle the aft portion of shaft 102. For example, the inner diameter of main body 210 may generally match the outer diameter of the aft portion of shaft 102. Thus, hub 200 may be mounted on shaft 102 by sliding the forward end of main body 210 over the aft portion of shaft 102, such that main body 210 encircles shaft 102. In practice, main body 210 may have an inner diameter that is slightly smaller than the outer diameter of the aft portion of shaft 102, so that, during assembly, hub 200 is heated to expand the inner diameter of main body 210, mounted on shaft 102, and then cooled to shrink main body 210 around shaft 102.

Main body 210 may comprise a plurality of axial apertures 212 through the aft end of main body 210. Apertures 212 may be arranged circumferentially around longitudinal axis L at equidistant intervals. Apertures 212 may align with axial holes in the aft end of shaft 102. Thus, after hub 200 has been mounted on the aft portion of shaft 102, fasteners (e.g., bolts, screws, etc.) may be inserted upstream, through the aligned pairs of one aperture 212 and one hole, from the aft end of main body 210. These fasteners prevent hub 200 from sliding relative to shaft 102 and also prevents hub 200 from rotating relative to shaft 102. Thus, as shaft 102 rotates around longitudinal axis L, hub 200 rotates with shaft 102 around longitudinal axis L. In an embodiment in which main body 210 is partially closed at the aft end, the opening therein should be shaped so as not to prevent proper attachment of the fasteners through the aligned pairs of an aperture 212 and a hole in the aft end of shaft 102.

The inner surface of main body 210 may comprise a ring of engagement members 214. Engagement members 214 may be arranged along a circumference of the inner surface of main body 210. In an embodiment, engagement members 214 comprise a plurality of parallel axial protrusions and/or parallel axial recesses that form alternating axially oriented (i.e., parallel to longitudinal axis L) ridges and axially oriented grooves around the entire inner circumference of the inner surface of main body 210. Engagement members 214 are configured to engage with corresponding engagement members arranged along a circumference of an outer surface of shaft 102. For example, the aft portion of shaft 102 may comprise corresponding ridges and grooves, such that each ridge of engagement members 214 fits within a groove of the engagement members on the aft portion of shaft 102, and each groove of engagement members on the aft portion of shaft 102 fits within a recess of engagement members 214. Engagement of engagement members 214 with the corresponding engagement members on the aft portion of shaft 102 helps prevent rotation of hub 200 relative to shaft 102 when installed on shaft 102. Thus, as shaft 102 rotates around longitudinal axis L, hub 200 rotates with shaft 102 around longitudinal axis L. The use of corresponding engagement members on hub 200 and shaft 102 may also facilitate the alignment of apertures 212 with the corresponding holes in the aft end of shaft 102.

The outer surface of main body 210 may comprise one or more sensor features that enable one or more sensors to measure one or more parameters of shaft 102 via hub 200. In the illustrated embodiment, these sensor features comprise a set of first notches 216 at the leading edge of main body 210, and a second notch 218 set back from the leading edge of main body 210. In an alternative embodiment, second notch 218 may be positioned at the leading edge of main body 210, and first notches 216 may be set back from the leading edge of main body 210, or both first notches 216 and second notch 218 may be set back from the leading edge of main body 210. A plurality of first notches 216 are arranged at equidistant intervals around the entire outer circumference of the outer surface of main body 210. First notches 216 can be used by a speed-pickup sensor to measure the speed of rotation of shaft 102, which is the speed of rotation of hub 200. Second notch 218 may be used by a keyphasor sensor to measure the keyphasor signal of shaft 102. In other alternative embodiments, one or both of these sensor features may be omitted and/or hub 200 may comprise one or more additional sensor features.

Middle portion 220 comprises a plurality of trim-weight holes 222. The plurality of trim-weight holes 222 may be arranged at equidistant intervals around the entire outer circumference of middle portion 220. Each trim-weight hole 222 is configured to hold a trim weight. Trim-weight holes 222 may be oriented radially into a radially outward facing surface of middle portion 220, such that trim weights can be inserted into trim-weight holes 222 and removed from trim-weight holes 222 along a radial axis. In an alternative embodiment, trim-weight holes 222 may be oriented axially or at an acute angle, greater than zero, with respect to a radial axis. In the illustrated embodiment, there are thirty-six trim-weight holes 222 (i.e., one trim-weight hole 222 for every 10 degrees). However, it should be understood that middle portion 220 may comprise or consist of any number of trim-weight holes 222 that is suitable for the applicable design objectives.

Flange 230 may comprise a plurality of axial apertures 232 through flange 230. The plurality of apertures 232 may be arranged at equidistant intervals around longitudinal axis L. Apertures 232 may align with corresponding axial apertures in a standard coupling flange of equipment to be coupled to hub 200 and driven by shaft 102. Thus, the equipment may be fixed to hub 200 by inserting fasteners (e.g., bolts, screws, etc.) through the aligned apertures. In the illustrated embodiment, the number of apertures 232 is equal to the number of trim-weight holes 222 (e.g., thirty-six). However, it should be understood that flange 230 may comprise or consist of any number of apertures 232, including a number of apertures 232 that is different than the number of trim-weight holes 222.

In a preferred embodiment, apertures 232 in flange 230 are offset and/or sufficiently set back from trim-weight holes 222 in middle portion 220, such that fasteners extending through aperture 232 do not intersect with the radial axes of any trim-weight holes 222. In other words, around longitudinal axis L, the positions of the plurality of trim-weight holes 222 may be offset from the plurality of apertures 232, such that none of the plurality of trim-weight holes 222 has a radial axis that intersects an axial axis through any of the plurality of apertures 232 in flange 230. This prevents any fasteners within apertures 232 from blocking access to trim-weight holes 222. Thus, trim weights can be inserted into or removed from trim-weight holes 222 even when fasteners are inserted through apertures 232 (i.e., after hub 200 has been coupled to equipment).

As examples, the equipment may comprise a generator set for generating power, a gas compressor for compressing gas, or the like. The equipment may itself comprise a shaft fixed to the coupling flange, such that the shaft of the equipment is driven by shaft 102 when the coupling flange is fixed to hub 200.

Figure 3:
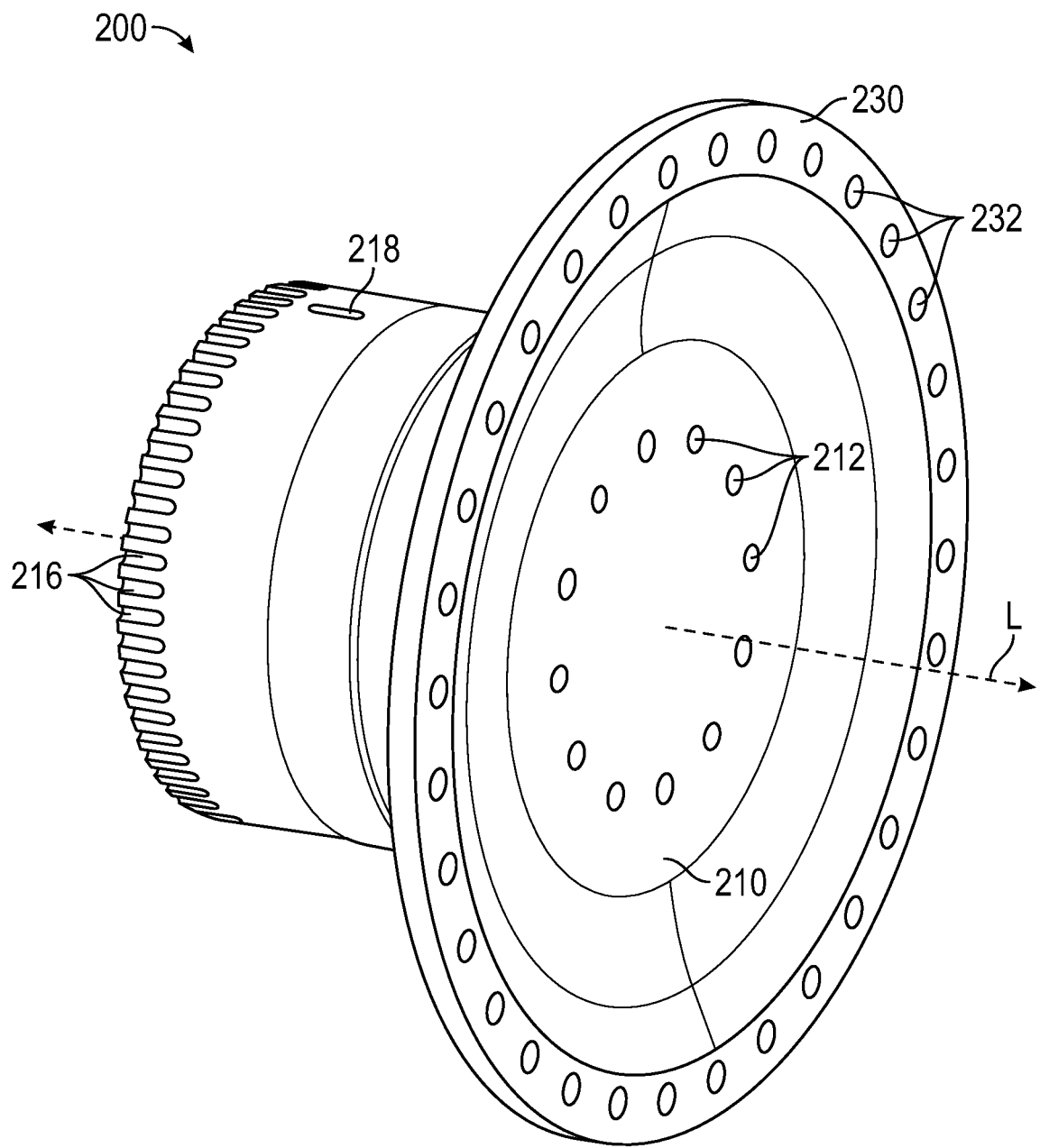
FIG. 3 illustrates an aft perspective view of the hub, according to an embodiment.

FIG. 3 illustrates an aft perspective view of hub 200, according to an embodiment. As illustrated, apertures 212 through the aft surface of main body 210 may be arranged at equidistant intervals around longitudinal axis L and around the periphery of the aft end of main body 210. In the illustrated embodiment, there are twelve apertures 212. However, it should be understood that the aft end of main body 210 may comprise or consist of any number of apertures 212 that is suitable for the applicable design objectives.

Figure 4:
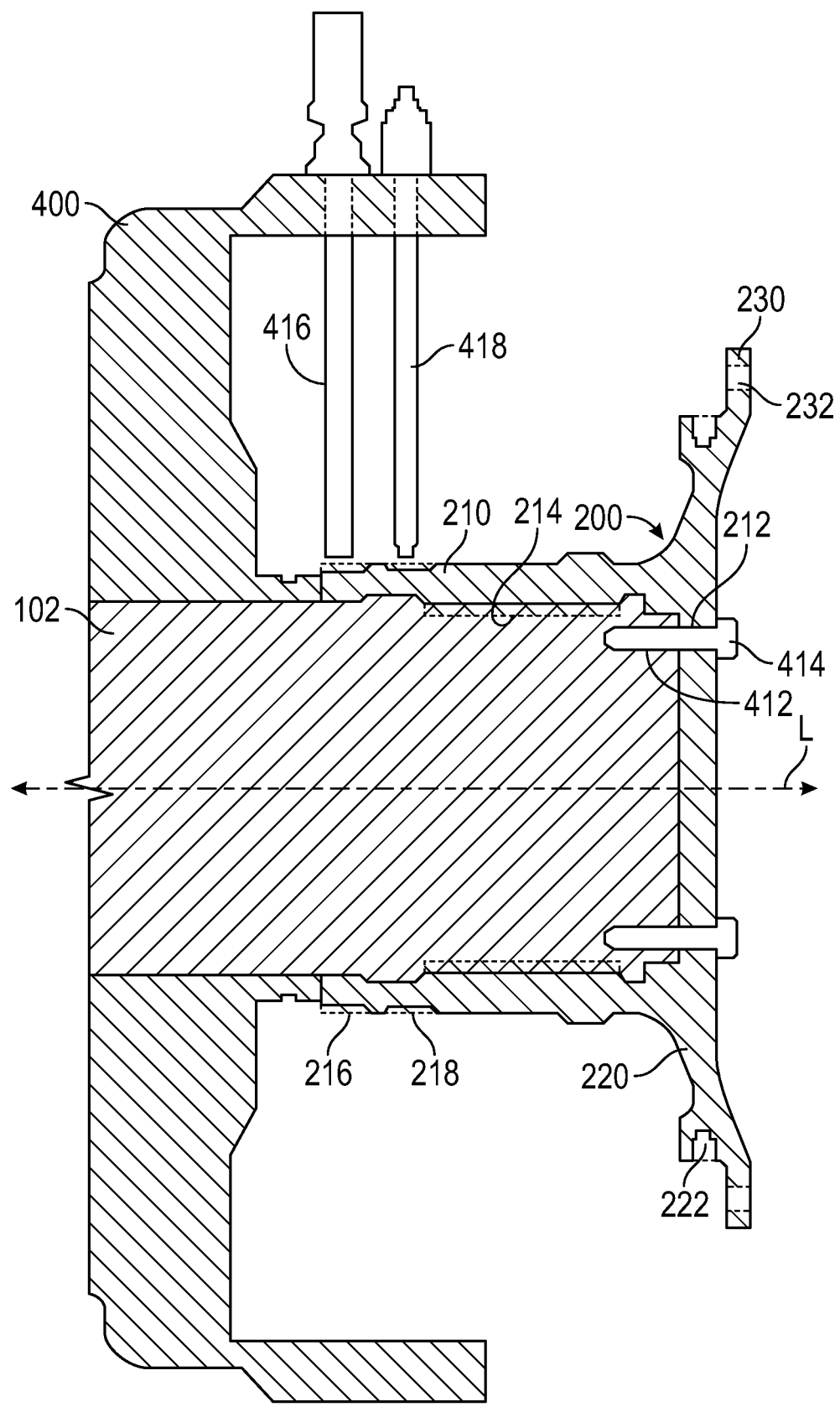
FIG. 4 illustrates a cross-sectional view of the hub installed on a shaft, according to an embodiment.

FIG. 4 illustrates a cross-sectional view of hub 200 installed on shaft 102, cut along a plane that includes longitudinal axis L, according to an embodiment. As illustrated, hub 200 may be secured to the aft portion of shaft 102 via fasteners 414 inserted through aligned pairs of one of apertures 212 through the aft end of main body 210 and one of axial holes 412 into the aft end of shaft 102. In addition, one or more sensors, illustrated as speed-pickup sensor 416 and keyphasor sensor 418, may be mounted within a housing 400 around the aft portion of shaft 102, to take measurements of shaft 102 via hub 200.

For example, as illustrated, speed-pickup sensor 416 may be arranged at a position that is radially outward from an axial position of the plurality of first notches 216. Speed-pickup sensor 416 may comprise a magnetic pickup unit (MPU) at the radially inward-most end. The magnetic pickup unit generates a magnetic field at its radially inward end. When the protrusions between first notches 216 pass through the magnetic field of the magnetic pickup unit, a voltage is developed in speed-pickup sensor 416. The frequency of this voltage can then be translated, by speed-pickup sensor 416 or an external system that receives an output signal of speed-pickup sensor 416, into a signal or measurement representing the rotational speed of shaft 102.

Keyphasor sensor 418 may work similarly or identically to speed-pickup sensor 416, but using second notch 218. For example, as illustrated, keyphasor sensor 418 may be arranged at a position that is radially outward from an axial position of second notch 218. Keyphasor sensor 418 may comprise a proximity probe, optical pickup unit (OPU), or magnetic pickup unit at its radially inward-most end. Keyphasor sensor 418 detects the passage of second notch 218 under its radially inward-most end, and may output a keyphasor signal comprising a pulse at each detected passage. Main body 210 may consist of a single second notch 218, such that the passage of second notch 218 occurs only once per rotation of shaft 102. The pulse output by keyphasor sensor 418 may be used as a zero phase reference for detecting unbalance (e.g., the phase angle of unbalance mass) on the rotor of turbine 140. The keyphasor signal can be used to generate data, including filtered vibration amplitude, phase lag, speed, and/or the like.

Figure 5:
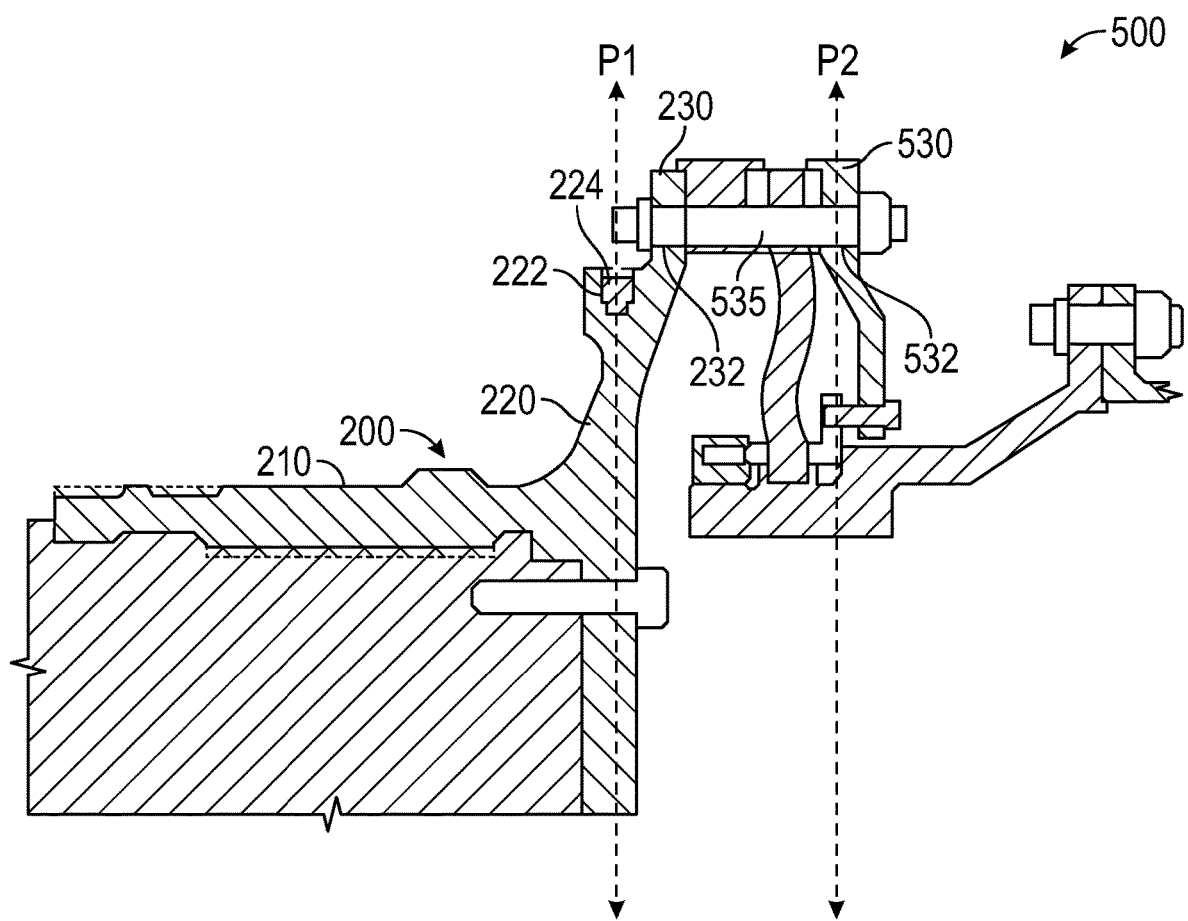
FIG. 5 illustrates a cross-sectional view of a coupling between the installed hub and equipment, according to an embodiment.

FIG. 5 illustrates a coupling between hub 200 and equipment 500, according to an embodiment. In the illustrated embodiment, flange 230 of hub 200 is coupled to a coupling flange 530 of a generator set as equipment 500. In particular, a fastener, illustrated as a bolt 535, is fixed through each aperture 232 on flange 230 and an aligned aperture 532 on coupling flange 530. It should be understood that other types of equipment 500 may utilize identical or similar couplings.

During trim balancing, a trim weight 224 may be inserted radially into one or more trim-weight holes 222 of middle portion 220. A trim weight 224 may have the same weight or a different weight as one or more other trim weights 224. It should be understood that some trim-weight holes 222 may be left empty. Trim weights 224 may be added into appropriate trim-weight holes 222 to correct any unbalance in the rotation of the rotor of turbine 140.

Notably, trim weights could also be added to coupling flange 530 or some other component of equipment 500. Thus, trim balancing can be performed in two balance planes. In particular, trim balancing can be performed in a first balance plane P1 by adding trim weight 224 to one or more trim-weight holes 222, and trim balancing can be additionally performed in a second balance plane P2 by adding trim weights to coupling flange 530 of equipment 500. Thus, a bending moment can be created on both balance planes P1 and P2 to alter both the amplitude and the shape of the rotor motion.

INDUSTRIAL APPLICABILITY

Conventionally, trim weights had to be used aft of the shaft (i.e., at or aft of coupling flange 530). Not only did this make trim balancing less effective, but it also meant that new trim balancing was required after replacement of the coupling. In addition, recoupling required heating and shrinking the coupling over shaft 102, which risked the safety of field personnel. Disclosed embodiments avoid these and other problems.

For example, hub 200 may be installed once in the factory as part of shaft 102. Once installed, hub 200 may remain fixed to shaft 102 for its lifetime. Factory installation is safer, more efficient, and can be performed more precisely to eliminate eccentricity issues.

In addition, trim balancing can be done in the factory by installing trim weights 224 into one or more trim-weight hole(s) 222, as needed. These trim weights 224 remain in hub 200, which remains with shaft 102. This is in contrast to conventional systems in which the trim weights are installed on coupling flange 530 of the equipment, and therefore, are removed with decoupling. In disclosed embodiments, the unbalance corrections remain with shaft 102, which minimizes the imbalance impact when the coupling is replaced.

Furthermore, because middle portion 220 is closer to the radial bearings than coupling flange 230, trim weights 224 can be added closer to the radial bearings than in traditional trim balancing. In particular, trim weights 224 can be added in balance plane P1, instead of only in balance plane P2. The closer proximity of trim weights 224 to the radial bearings is more effective in reducing the vibration levels of the radial bearings. It also enables heavier trim weights 224 to be used. The result is significantly greater centrifugal forces, which can be used to alter the mode shapes of the rotor.

In addition, with hub 200, trim balancing can be performed in two balance planes, P1 and P2, to provide more flexibility in altering the mode shape of the rotor. In other words, weight can be added to one or both of balance planes P1 and P2 to correct vibrations in the radial bearings. Thus, hub 200 improves the ability to control vibration responses.

Furthermore, coupling flange 530 of equipment 500, which can be standardized over different types of equipment, can simply and efficiently be coupled to and uncoupled from flange 230 of hub 200, without the need of special tools. This may reduce wear on other components as well, thereby increasing the service life of gas turbine engine 100. This is in contrast to conventional systems, in which the coupling of equipment 500 had to be heated and shrunk over shaft 102. With hub 200, field personnel no longer have to work with a heat source and move heavy, heated components to couple equipment 500 to shaft 102. Thus, hub 200 improves both efficiency and safety. Pilot fits at flanges 230 and 530 can be used to ensure concentricity with longitudinal axis L.

Hub 200 may also comprise sensor features, such as first notches 216 for speed-pickup sensor 416 and second notch 218 for keyphasor sensor 418. Conventionally, such sensor features had to be incorporated into a separate, dedicated speed ring around shaft 102. Hub 200 eliminates the need for a separate speed ring.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a gas turbine engine and/or with certain equipment, it will be appreciated that it can be implemented in various other types of machines with rotors and with various other types of equipment driven by rotors, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A hub for a turbine shaft, the hub comprising:
a cylindrical main body that is open at a forward end and at least partially closed at an aft end along a longitudinal axis, wherein the aft end comprises a plurality of first axial apertures;
a middle portion extending outward from the main body, wherein the middle portion includes a plurality of trim-weight holes arranged circumferentially around the longitudinal axis, wherein each of the plurality of trim-weight holes is configured to hold a trim weight; and
a flange extending outward from the middle portion, wherein the flange includes a plurality of second axial apertures;
wherein the main body further comprises a plurality of engagement members arranged around a circumference of an inner surface of the main body.

2. The hub of claim 1, wherein the plurality of engagement members comprises alternating axially oriented ridges and axially oriented grooves.

3. The hub of claim 1, wherein the main body further comprises a plurality of first notches arranged at equidistant intervals around a circumference of an outer surface of the main body.

4. The hub of claim 3, wherein the plurality of first notches is positioned at an edge of the forward end of the main body.

5. The hub of claim 3, wherein the main body further comprises a second notch in the outer surface of the main body at an axial position that is different from an axial position of the plurality of first notches along the longitudinal axis.

6. The hub of claim 5, wherein the second notch is closer to the aft end of the main body than the plurality of first notches are to the aft end of the main body.

7. The hub of claim 1, wherein the main body further comprises at least one notch in an outer surface of the main body.

8. The hub of claim 7, wherein the at least one notch is set back from an edge of the forward end of the main body.

9. The hub of claim 1, wherein each of the plurality of trim-weight holes is oriented along a radial axis that is orthogonal to the longitudinal axis.

10. The hub of claim 9, wherein, around the longitudinal axis, positions of the plurality of trim-weight holes are respectively offset from the plurality of second axial apertures, such that none of the plurality of trim-weight holes has a radial axis that intersects an axial axis through any of the plurality of second axial apertures in the flange.

11. An assembly comprising:
a turbine shaft comprising a plurality of axial holes in an aft end of the turbine shaft;
the hub of claim 1, mounted on an aft portion of the turbine shaft, such that the main body encircles the aft portion of the turbine shaft and the plurality of first axial apertures in the aft end of the main body are aligned with the plurality of axial holes in the aft end of the turbine shaft; and
a plurality of fasteners, wherein each of the plurality of fasteners respectively extends through an aligned pair of one of the first axial apertures and one of the plurality of axial holes, to thereby fix the hub to the turbine shaft.

12. The assembly of claim 11,
wherein the main body of the hub further comprises
a plurality of first notches arranged at equidistant intervals around a circumference of an outer surface of the main body, and
a second notch in the outer surface of the main body at an axial position that is different from an axial position of the plurality of first notches along the longitudinal axis, and
wherein the assembly further comprises
a speed-pickup sensor arranged at a position that is radially outward from the axial position of the plurality of first notches, and
a keyphasor sensor arranged at a position that is radially outward from the axial position of the second notch.

13. A hub for a turbine shaft, the hub comprising:
a cylindrical main body that is open at a forward end and at least partially closed at an aft end along a longitudinal axis, wherein the aft end comprises a plurality of first axial apertures, and wherein the main body comprises
a plurality of engagement members arranged along a circumference of an inner surface of the main body,
a plurality of first notches arranged at equidistant intervals around a circumference of an outer surface of the main body, and
a second notch in the outer surface of the main body at an axial position that is different from an axial position of the plurality of first notches along the longitudinal axis;
a middle portion extending outward from an aft portion of the main body, wherein the middle portion includes a plurality of trim-weight holes arranged circumferentially around the longitudinal axis, wherein each of the plurality of trim-weight holes is configured to hold a trim weight; and a flange extending outward from the middle portion, wherein the flange includes a plurality of second axial apertures.

14. The hub of claim 13, wherein the plurality of engagement members comprises alternating axially oriented ridges and axially oriented grooves.

15. The hub of claim 13, wherein the plurality of first notches is positioned at an edge of the forward end of the main body.

16. The hub of claim 15, wherein the second notch is set back from the edge of the forward end of the main body, aft of the plurality of first notches.

17. The hub of claim 15, wherein each of the plurality of trim-weight holes is oriented along a radial axis that is orthogonal to the longitudinal axis, and wherein, around the longitudinal axis, positions of the plurality of trim-weight holes are respectively offset from the plurality of second axial apertures, such that none of the plurality of trim-weight holes has a radial axis that intersects an axial axis through any of the plurality of second axial apertures in the flange.

18. An assembly comprising:
   a turbine shaft that includes
      a plurality of first engagement members arranged along a circumference of an outer surface of the turbine shaft, and
      a plurality of axial holes in an aft end of the turbine shaft, a hub that includes
      a cylindrical main body encircling an aft portion of the turbine shaft, wherein the main body is at least partially closed at an aft end, wherein the aft end of the main body comprises a plurality of first axial apertures that are aligned with the plurality of axial holes in the aft end of the turbine shaft, and wherein the main body comprises a plurality of second engagement members, arranged along a circumference of an inner surface of the main body, that engages with the plurality of first engagement members,
      a middle portion extending outward from the main body, wherein the middle portion includes a plurality of trim-weight holes arranged circumferentially around a longitudinal axis of the turbine shaft, and wherein each of the plurality of trim-weight holes is configured to hold a trim weight, and
      a flange extending outward from the middle portion, wherein the flange includes a plurality of second axial apertures; and
   a plurality of fasteners, wherein each of the plurality of fasteners extends through an aligned pair of one of the first axial apertures and one of the plurality of axial holes, to thereby fix the hub to the turbine shaft.

19. A gas turbine engine comprising:
   a compressor;
   a combustor downstream from the compressor; and
   a turbine downstream from the combustor, wherein the turbine includes the assembly of claim 18.

* * * * *